United States Patent
Gottlieb

(10) Patent No.: US 7,516,339 B2
(45) Date of Patent: Apr. 7, 2009

(54) LOW POWER ELECTRONIC CIRCUIT INCORPORATING REAL TIME CLOCK

(75) Inventor: Gary Gottlieb, Irvine, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 445 days.

(21) Appl. No.: 11/415,891

(22) Filed: May 1, 2006

(65) Prior Publication Data

US 2007/0074056 A1    Mar. 29, 2007

Related U.S. Application Data

(60) Provisional application No. 60/678,618, filed on May 5, 2005.

(51) Int. Cl.
*G06F 1/00*  (2006.01)
*G06F 1/26*  (2006.01)
*G06F 1/32*  (2006.01)

(52) U.S. Cl. .................. 713/300; 713/320; 713/324

(58) Field of Classification Search ............. 713/300, 713/320, 324
See application file for complete search history.

(56) References Cited

U.S. PATENT DOCUMENTS

| | | | | |
|---|---|---|---|---|
| 4,754,160 A * | 6/1988 | Ely | ............................. | 307/64 |
| 5,493,203 A * | 2/1996 | Dalton | ....................... | 323/282 |
| 5,838,171 A * | 11/1998 | Davis | .......................... | 327/19 |
| 6,611,918 B1 * | 8/2003 | Uzelac | ....................... | 713/320 |
| 7,400,206 B2 * | 7/2008 | Sheng et al. | ............... | 331/36 C |

* cited by examiner

*Primary Examiner*—Thomas Lee
*Assistant Examiner*—Jl H Bae
(74) *Attorney, Agent, or Firm*—W. Eric Boyd, Esq.

(57) ABSTRACT

A power conserving electronic circuit is provided having one or more main electronic devices or components powered by the output of a voltage regulator circuit. The voltage regulator is powered by a first power input, such as a battery. A real time clock circuit enables the voltage regulator, which, in turn, enables the main devices. The real time clock further provides an enable/disable output to a switch circuit whereby the real time clock circuit is powered by the output of the voltage regulator when the main devices are active and powered from the battery when the main devices are inactive.

9 Claims, 2 Drawing Sheets

LOW POWER ELECTRONIC CIRCUIT INCORPORATING REAL TIME CLOCK

CROSS-REFERENCE TO RELATED APPLICATIONS

This application claims the benefit of U.S. Provisional Patent Application 60/678,618 filed on May 5, 2005, which application is incorporated fully herein by reference.

BACKGROUND OF THE INVENTION

1. Field of the Invention

The invention generally relates to the field of electronic circuits. Specifically, the invention relates to a low-power electronic circuit system incorporating a real time clock circuit and an electronic switch circuit whereby power requirements for system devices are optimized dependent upon the active or inactive state of the system.

2. Background of the Invention

Numerous electronic applications incorporate the use of real time clock (RTC) circuitry in cooperation with other electronics such as mobile telephones, GPS, personal digital assistants and other portable battery-powered devices.

In these and other systems, an RTC may be used to keep time (seconds, minutes, hours, days, months and years) and can be implemented to enable or "wake up" one or more system components, referred to herein as "main devices", at user-defined time intervals. Common components in these systems may comprise microprocessors, universal serial bus interface devices, memory devices or RF transmitter/receivers.

In portable applications where a battery power source is used, overall system power consumption is a prime concern. In order to reduce overall power consumption of the system, one or more of the system components is typically put into an inactive or suspended state, sometimes referred to as a standby mode. While this measurably reduces current consumption, there nonetheless remains some standby current used by the devices while in an inactive state. A greater reduction in current while in the inactive state can be achieved by depriving power-controlled devices of supply power as opposed to logically disabling them.

Aside from being a source of a limited power, battery power sources also maintain the undesirable attribute of having a variable voltage across the battery, which variance can be, in the case of a 3.6 V Li-Ion battery, in the range of 17% (3.0 V-4.2V). While an RTC is capable of using a battery supply voltage with this degree of variability, the above-mentioned system components typically cannot and will require the use of a supply voltage ranging not more than 5% from nominal. This has the undesirable result of incompatible supply voltage requirements for the RTC and other system components.

In prior art applications, a voltage regulator circuit can be used to regulate a variable battery supply voltage whereby a relatively stable output voltage from the voltage regulator circuit is used to supply power to the system components with tighter voltage supply requirements. In this instance, the voltage at the voltage regulator output will be lower than the lowest battery voltage, less the required voltage drop across the voltage regulator circuit.

What is needed is a device that can address the above design concerns that is simple in design and low in cost.

SUMMARY OF THE INVENTION

The invention comprises a low power electronic circuit having one or more main electronic devices or components powered from a voltage regulator circuit. The voltage regulator is powered by a primary power source, such as a battery that provides a first power input.

A real time clock circuit is provided and is used to enable the voltage regulator, which, in turn, enables the main devices by supplying power to them. The real time clock circuit further provides an enable output to a switch circuit whereby the real time clock circuit is powered by the output of the voltage regulator when the main devices are active and is powered from the battery when the main devices are inactive, i.e., disabled.

While the claimed devices and methods are described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention and its various embodiments can now be better understood by turning to the following detailed description of the preferred embodiments, which are presented as examples of the invention defined in the claims. It is expressly understood that the invention as defined by the claims may be broader than the embodiments described below.

DETAILED DESCRIPTION OF THE INVENTION

Figure 1A:
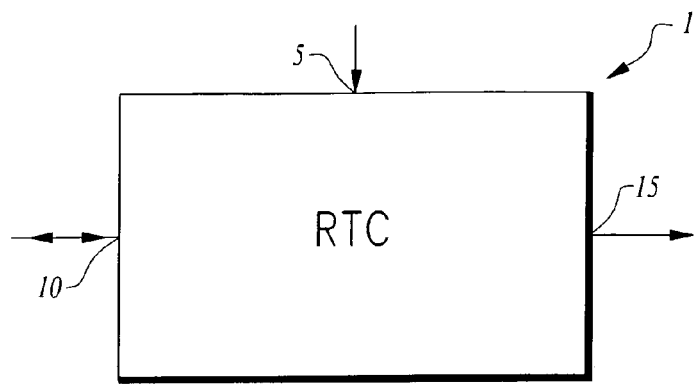
FIGS. 1a and 1b show block diagrams of a preferred embodiment of a real time clock circuit of the present invention.

Turning now to the figures wherein like numerals denote like elements among the several views, FIG. 1a illustrates an exemplar preferred embodiment of a real time clock circuit 1 having a real time clock power input 5, a real time clock interface I/O 10 and a real time clock enable output 15.

Figure 1B:
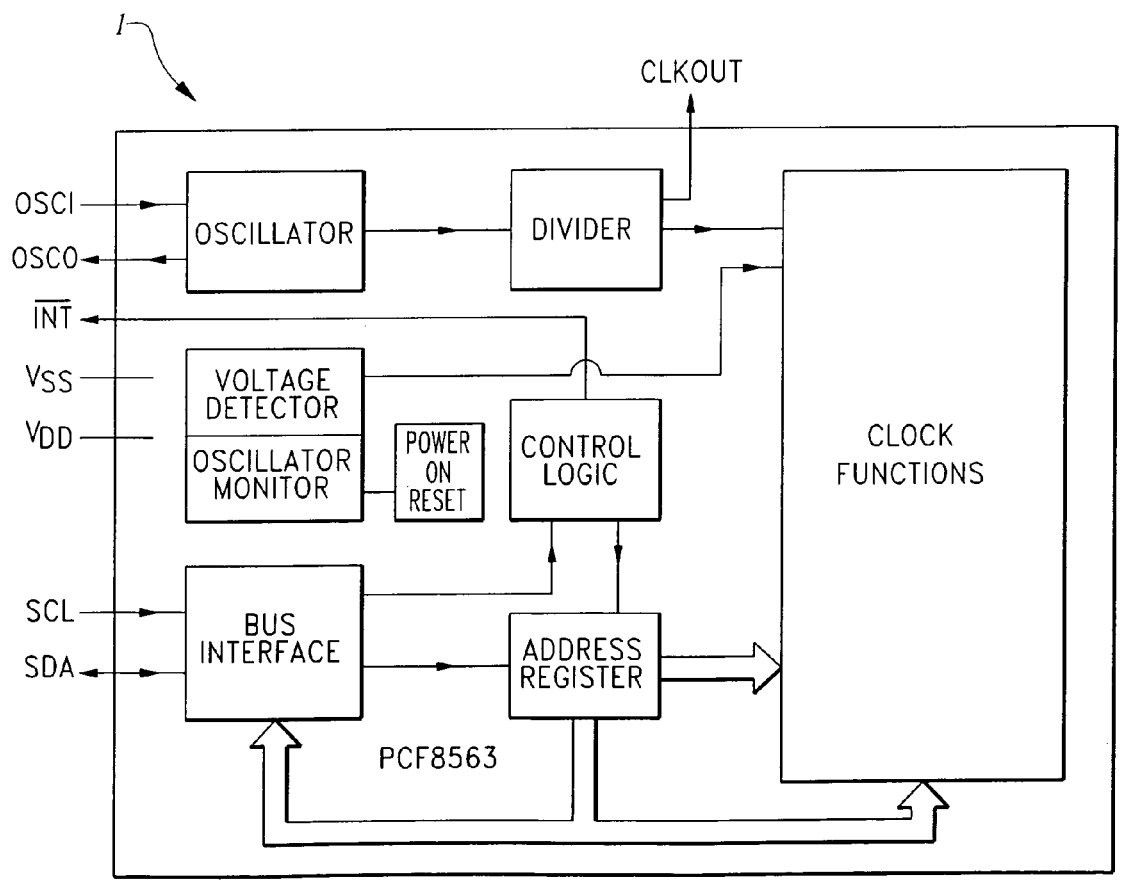

FIG. 1b shows an internal block diagram of a preferred embodiment of a real time clock circuit in the form of an integrated circuit chip as is available from Philips Semiconductor N.V. In a preferred embodiment of the invention, Philips Semiconductor Real Time Clock P/N PFC8563 is used for timekeeping/enabling functions in the invention, providing year, month, day, weekday, hours, minutes and seconds with a programmable clock output and interrupt output. It is expressly noted that the invention is not limited to the PFC8563 form of real time clock circuit and that any equivalent form of real time clock circuit may be implemented.

Figure 2:
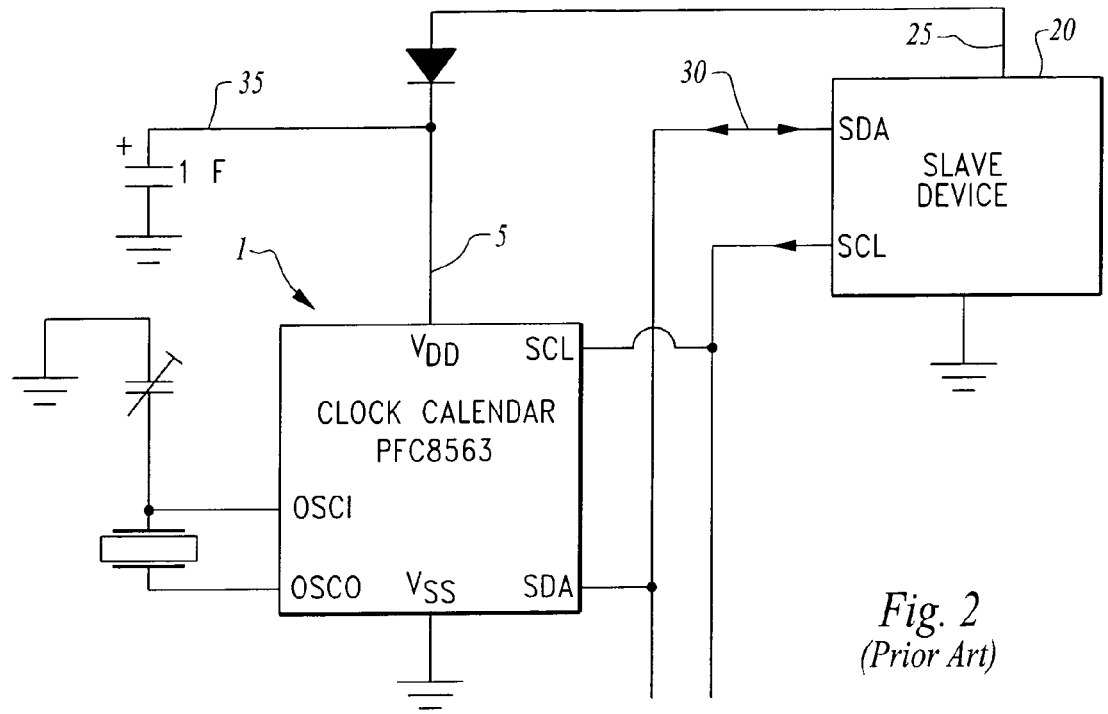
FIG. 2 illustrates a prior art application of a real time clock circuit.

A prior art method of supplying a real time clock circuit with power is illustrated in FIG. 2, showing a main device 20, in this case a master transmitter/receiver having a main device power input 25 and a main device interface I/O 30. Main device 20 has a main device voltage requirement or range specified by the manufacturer. In this illustrated prior art embodiment, real time clock power input 5 and main device power input 25 are supplied with power from a common voltage source, referred to herein as a first power input 35. The use of a common power source for each of these devices retains the deficiencies noted above, including increased power consumption and conflicting power supply tolerances and requirements.

The prior art method works when both, the real time clock and the main device, are powered from the same voltage at first power input 35. When main device 20 is comprised of integrated circuits requiring voltage as low as 1.8V or even 1.2V, a problem arises. The main device must be powered from a voltage regulator with an output voltage of 1.8V or less. The output of the voltage regulator biases pull up resistors R depicted on the FIG. 2 to satisfy voltage requirements to the data interface of the main device. First power input 35 of the real time clock remains connected to the first power input 35, requiring a voltage for the data interface at a minimum of 80% of its own real time clock power input 5. The voltage output range from a battery 3.0V-4.2V creates 2.4V-3.36V (80% of the battery range) voltage range requirement for data interface of the real time clock. This creates contradicting requirements to the data interface; the real time clock requirement is 2.4V-3.36V, but the main device requires 1.8V or lower.

Figure 3:
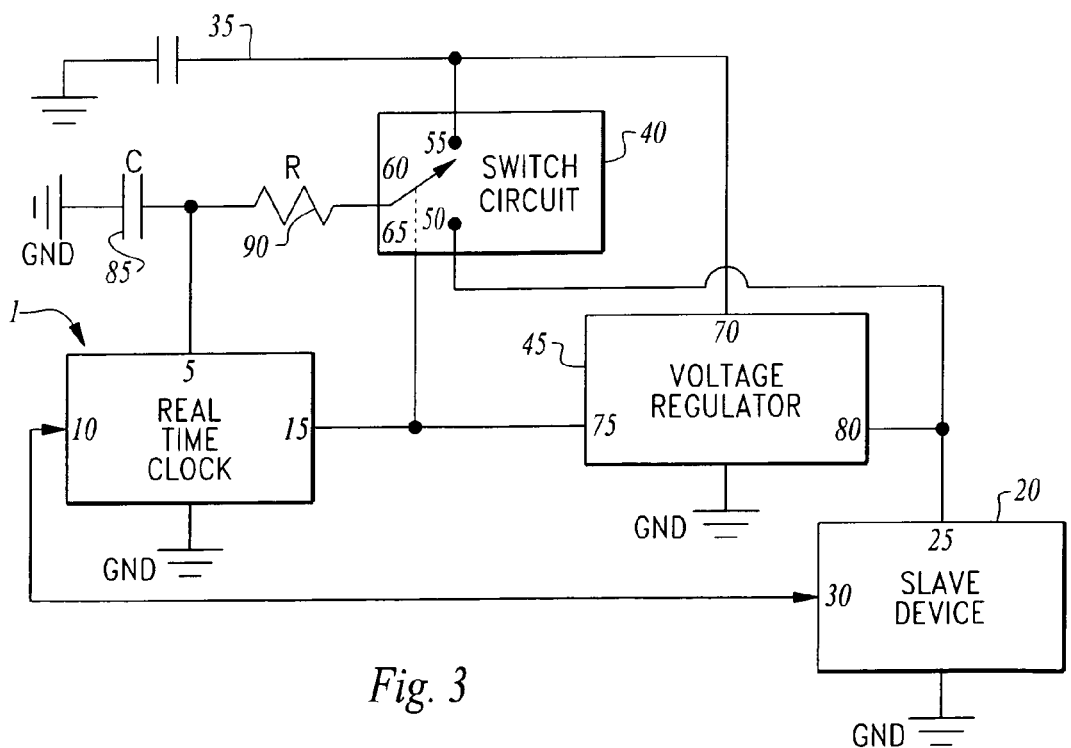
FIG. 3 is a block schematic diagram of the low power electronic circuit of the present invention

Turning now to FIG. 3, a preferred embodiment of the invention is disclosed. A primary power source, such as a battery, charged capacitor or an external power source, provides a first power input 35. First power input 35 provides supply voltages to switch circuit 40 and to voltage regulator circuit 45.

Switch circuit 40 is comprised of a first switch input 50, second switch input 55, switch output 60 and a switch enable or switch control input 65. Switch circuit 40 is preferably an analog single pole, double throw (SPDT) switch integrated circuit chip such as the SPDT Switch P/N ADG786 available from Analog Devices, Inc. An alternative embodiment incorporates the use of a relay or equivalent circuit in the place of switch circuit 40.

Voltage regulator circuit 45 comprises a voltage regulator input 70 for the receiving of a supply voltage such as first power input 35. Voltage regulator circuit 45 further comprises a voltage regulator enable input 75 whereby the application of an electronic signal such as a logical 1 or 0 may selectively enable or disable voltage regulator circuit 45. Yet further, voltage regulator circuit 45 comprises a voltage regulator output 80, which provides output voltage required by the main device 20. Voltage regulator output 80 is in electrical connection with first switch input 50 and with main device power input 25 for supplying of supply voltage to the respective components.

Voltage regulator input 70 and second switch input 55 are in common electrical connection with first power input 35

In a preferred embodiment, voltage regulator circuit 45 is a Miniature Step-Down DC-DC Converter, P/N LM3670, available from National Semiconductor Corp., in integrated circuit chip form. The above integrated circuit chip is well-suited to low voltage applications and comprises an enable pin (EN) which acts as a shutdown for the voltage regulator circuit when a logical 0 is applied, which pin may be configured for use as voltage regulator enable input 75 in the disclosed invention and its various embodiments.

Real time clock circuit power input 5 is in electrical connection with switch output 60 whereby real time clock circuit 1 is powered by the output of switch circuit 40, which will vary dependant upon the switch pole state. Real time clock circuit interface I/O 10 is in communication with one or more main devices by means of interface I/O 30 for the transmission and receiving data between the respective devices during circuit operation.

As discussed above, all manner of electronic devices may function as main devices in the disclosed invention including, by way of example and not by limitation, microprocessors, universal serial bus interface devices, memory devices or RF transmitter/receivers.

In a preferred embodiment of the invention, the SDA (serial data input/output) of the PFC8563 may be used for transmission and receiving of data between the respective devices while the INT (interrupt) output may be conveniently programmed to function as the real time clock enable output 15 wherein an enabling output signal is generated to enable the voltage regulator 45 and respective main devices 20 in electrical connection therewith.

Real time clock enable output 15 is in electrical connection with switch control input 65 and voltage regulator enable input 75. In this manner, voltage regulator circuit 45 is enabled and second switch input 55 is toggled to be active upon the appropriate output from real time clock enable output 15.

When main device 20 of the invention is to be set in an inactive mode, real time clock enable output 15 is set to provide a disable signal to voltage regulator enable input 75, which, in turn, turns voltage regulator circuit 45 to a standby state. With voltage regulator circuit 45 disabled, any device powered from its output is disabled, e.g., main device 20, in this instance.

The same disable signal is applied to switch control input 65 whereby the switch pole position is set to provide continuity from second switch input 55 to switch output 60. This switch setting has the effect of routing first power input 35 to real time clock power input 5. In this manner, during system active state, real time clock circuit 1 is powered directly from first power input 35 while the remaining system components are at zero power consumption, inactive state. Leakage current of the voltage regulator 45 comprises the load to the battery. For known voltage regulators like LM3670 and similar devices, that leakage current is several orders of magnitude lower than the power consumption of the main device in its inactive state.

Upon the assertion of an enable signal from real time clock enable output 15, switch control input 65 is set to provide continuity between first switch input 50 and switch output 60. Concurrently, the asserted enabling signal generated from real time clock enable output 15 is applied to voltage regulator enable input 75, powering up voltage regulator circuit 45 and providing a stable output at voltage regulator output 80. The voltage regulator output voltage is routed to main device power input 25, enabling main device operation. At the same time, the voltage at voltage regulator output 80 is routed through first switch input 50, to switch output 60 and to real time clock power input 5. In this active mode of operation, real time clock circuit 1 and main device 20 are each powered from the output of voltage regulator circuit 45.

The addition of capacitor 85 and resistor 90 in the disclosed invention provides the beneficial result of holding and smoothing the supply voltage to real time clock circuit 1 at switch output 60 during switch state transition to and from enable to disable.

The above manner of operation has the desirable benefit of greatly reduced current consumption when the circuit is inactive and compatible logic voltage levels for interface between the real time clock and main devices because they both are powered from the same voltage from the voltage regulator 45.

In an alternative preferred embodiment, first power input 35 is provided by a charged capacitor, for example a 1F capacitor, in conjunction with a diode as is reflected in FIG. 1.

Many alterations and modifications may be made by those having ordinary skill in the art without departing from the spirit and scope of the invention. For instance, by way of example and not by limitation, any suitable means of providing an equivalent circuit function of the various circuits described herein is within the scope of the invention.

Therefore, it must be understood that the illustrated embodiment has been set forth only for the purpose of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed even when not initially claimed in such combinations.

The words used in this specification to describe the invention and its various embodiments are to be understood not only in the sense of their commonly defined meanings, but to include by special definition in this specification, structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are therefore defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can, in some cases be excised from the combination and that the claimed combination may be directed to a sub-combination or variation of a sub combination.

Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the fundamental idea of the invention.

I claim:

1. A power-conserving electrical circuit comprising:
   an electrical power source comprising a first power input,
   a voltage regulator circuit comprising a voltage regulator input, a voltage regulator output and a voltage regulator enable input,
   a real time clock circuit comprising a real time clock power input, a real time clock interface I/O and a real time clock enable output,
   a main device having a main device voltage requirement and comprising a main device power input in electrical connection with said voltage regulator output, and further comprising a main device interface I/O in electrical connection with said real time clock circuit I/O,
   a switch circuit comprising a first switch input in electrical connection with said first power input and a second switch input in electrical connection with said voltage regulator output, a switch output, and a switch control input for the selective routing of said first power input or said voltage regulator output to said switch output,
   said switch output in electrical connection with said real time clock circuit power input, and,
   said real time clock circuit enable output in electrical connection with said switch control input and said voltage regulator enable input.

2. The electrical circuit of claim 1 wherein said electrical power source is a battery.

3. The electrical circuit of claim 1 wherein said electrical power source is a capacitor.

4. The electrical circuit of claim 1 wherein said switch circuit is an analog switch.

5. The electrical circuit of claim 1 wherein said switch circuit is a single pole, double throw analog switch.

6. The electrical circuit of claim 1 wherein said main device is a microprocessor.

7. The electrical circuit of claim 1 wherein said main device is a universal serial bus interface device.

8. The electrical circuit of claim 1 wherein said main device is a memory device.

9. The electrical circuit of claim 1 further comprising a capacitor in electrical connection with said switch output.

* * * * *